(12) United States Patent
Bailey et al.

(10) Patent No.: US 7,389,440 B2
(45) Date of Patent: Jun. 17, 2008

(54) METHOD, SYSTEM, AND APPARATUS FOR IMPROVING MULTI-CORE PROCESSOR PERFORMANCE

(75) Inventors: Daniel W. Bailey, Austin, TX (US); Todd Dutton, Southborough, MA (US); Tryggve Fossum, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/336,681

(22) Filed: Jan. 20, 2006

(65) Prior Publication Data

US 2006/0123264 A1    Jun. 8, 2006

Related U.S. Application Data

(62) Division of application No. 10/621,228, filed on Jul. 15, 2003, now abandoned.

(51) Int. Cl.
*G06F 1/00* (2006.01)
*G06F 1/26* (2006.01)

(52) U.S. Cl. .................. 713/323; 713/300; 713/320

(58) Field of Classification Search ................ 713/300, 713/320, 323
See application file for complete search history.

(56) References Cited

U.S. PATENT DOCUMENTS

| | | | |
|---|---|---|---|
| 5,168,554 A | 12/1992 | Luke | |
| 5,737,615 A | 4/1998 | Tetrick | |
| 5,913,069 A | 6/1999 | Sugumar et al. | |
| 5,968,167 A | 10/1999 | Whittaker et al. | |
| 6,357,016 B1 | 3/2002 | Rodger et al. | |
| 6,549,954 B1 | 4/2003 | Lambrecht et al. | |
| 6,550,020 B1 | 4/2003 | Floyd et al. | |
| 6,574,739 B1 | 6/2003 | Kung et al. | |
| 6,640,282 B2 | 10/2003 | MacLaren et al. | |
| 6,804,632 B2* | 10/2004 | Orenstien et al. | 702/188 |
| 6,883,107 B2 | 4/2005 | Rodgers et al. | |
| 6,889,319 B1 | 5/2005 | Rodgers et al. | |
| 6,920,572 B2 | 7/2005 | Nguyen et al. | |
| 6,931,506 B2 | 8/2005 | Audrain | |
| 6,934,727 B2 | 8/2005 | Berkowitz et al. | |
| 6,971,034 B2* | 11/2005 | Samson et al. | 713/300 |
| 7,093,147 B2 | 8/2006 | Farkas et al. | |
| 2002/0018877 A1 | 2/2002 | Woodall et al. | |
| 2003/0079151 A1 | 4/2003 | Bohrer et al. | |
| 2003/0084154 A1 | 5/2003 | Bohrer et al. | |

(Continued)

FOREIGN PATENT DOCUMENTS

WO    WO 02/39242 A1    5/2002

OTHER PUBLICATIONS

IEEE, IEEE 100, The Authoritative Dictionary of IEEE Standard Terms, 2000, Standards Information Network, 7th edition, pp. 904.*

(Continued)

*Primary Examiner*—Rehana Perveen
*Assistant Examiner*—Stefan Stoynov
(74) *Attorney, Agent, or Firm*—Blakely, Sokoloff, Taylor & Zafman LLP

(57) ABSTRACT

A system, apparatus, and method for a core rationing logic to enable cores of a multi-core processor to adhere to various power and thermal constraints.

14 Claims, 4 Drawing Sheets

U.S. PATENT DOCUMENTS

2003/0115495 A1 6/2003 Rawson, III
2004/0128663 A1 7/2004 Rotem

OTHER PUBLICATIONS

The First Office Action issued in Chinese Patent Application No. 200410070913.7, mailed Jun. 23, 2006, 9 pgs (includes English translation).
Office Action from U.S. Appl. No. 11/336,015, mailed Oct. 25, 2006, 7 pgs.
Office Action from U.S. Appl. No. 11/336,302, mailed Nov. 6, 2006, 7 pgs.
Office Action from U.S. Appl. No. 11/336,303, mailed Nov. 22, 2006, 8 pgs.
IEEE, IEEE 100, The Authoritative Dictionary of IEEE Standards Terms, 2000, Standards Information Network, 7th edition, pp. 904.
Notice of Allowance from U.S. Appl. No. 11/336,015, mailed Nov. 5, 2007, 10 pgs.
Office Action from U.S. Appl. No. 11/336,302, mailed Apr. 16, 2007.
Foreign Office Action from Counterpart Korean Patent Application No. 10-2006-70000942, mailed Feb. 26, 2007.
Second Foreign Office Action from Counterpart Chinese Patent Application No. 200410070913.7, mailed Feb. 16, 2007.
Third Foreign Office Action from Counterpart Chinese Patent Application No. 200410070913.7, mailed Jun. 8, 2007.
Foreign Office Action from Counterpart Taiwan Patent Application No. 93120990, mailed Jul. 26, 2006.
Foreign Office Action from Counterpart Great Britain Patent Application No. GB0602753.6, dated May 23, 2007.
Foreign Office Action from Counterpart Great Britian Patent Application No. GB0602753.6, dated Nov. 1, 2007.
Foreign Office Action from Counterpart Tawain Patent Application No. 93120990, dated Jul. 26, 2006.
Office Action from U.S. Appl. No. 11/336,015, mailed Apr. 16, 2007, 13 pgs.
Office Action from U.S. Appl. No. 11/336,303, mailed Jun. 13, 2007, 5 pgs.
Sholander, P., et al., "The Effect of Algorithm-Agile Encryption on ATM Quality of Service", IEEE, 1997, pp. 470-474.
Foreign Office Action from Counterpart Korean Patent Application No. 10-2006-7000942, mailed Mar. 19, 2008, 5 pages.

* cited by examiner

METHOD, SYSTEM, AND APPARATUS FOR IMPROVING MULTI-CORE PROCESSOR PERFORMANCE

CROSS-REFERENCES TO RELATED APPLICATIONS

The application is a division of U.S. patent application Ser. No. 10/621,228 filed Jul. 15, 2003 now abandoned and "A Method, System, and Apparatus for Improving Multi-Core Processor Performance," and is related to three concurrently filed U.S. patent application Ser. No. 11/336,302 filed Jan. 20, 2006, U.S. patent application Ser. No. 11/336,303 filed Jan. 20, 2006, and U.S. patent application Ser. No. 11/336,015 filed Jan. 20, 2006.

BACKGROUND

1. Field

The present disclosure pertains to the field of power management. More particularly, the present disclosure pertains to a new method and apparatus for improving multi-core processor performance despite power constraints.

2. Description of Related Art

Power management schemes allow for reducing power consumption to achieve low power applications for various types of and systems and integrated devices, such as, servers, laptops, processors and desktops. Typically, software methods are employed for systems and integrated devices to support multiple power states for optimizing performance based at least in part on the Central Processing Unit (CPU) activity.

Present power management schemes either decrease voltage or frequency or both for reducing power consumption. However, this results in decreased overall performance. Also, some methods incorporate analog designs that have various challenges relating to loop stability for transient workloads, calibration, and tuning.

With the introduction of processors with multiple cores, power management becomes a major concern because of the increase in cores operating at high frequencies and voltages and need to adhere to various power constraints, such as, thermal limits, maximum current, and Vcc range.

BRIEF DESCRIPTION OF THE FIGURES

The present invention is illustrated by way of example and not limitation in the Figures of the accompanying drawings.

DETAILED DESCRIPTION

Figure 1:
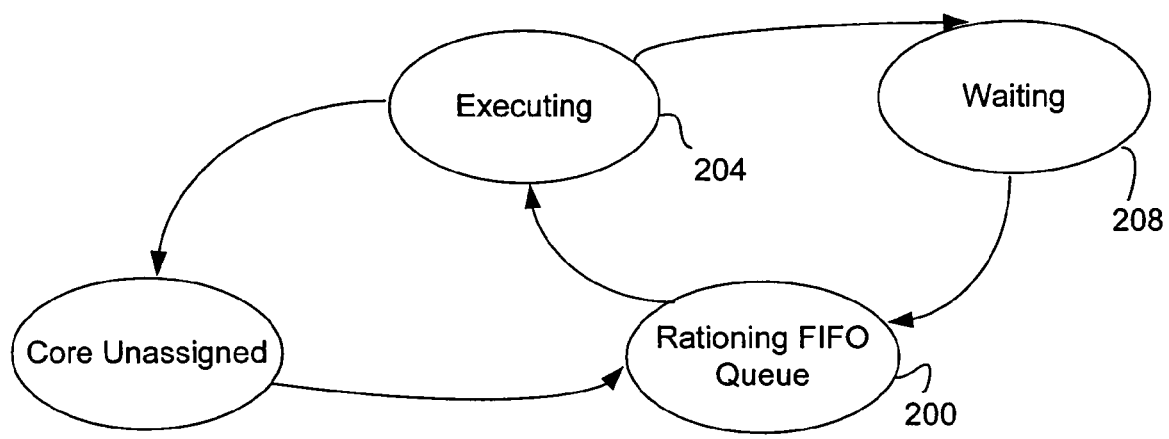
FIG. 1 illustrates a flowchart for a method utilized in accordance with an embodiment

The following description provides method and apparatus for improved multi-core processor performance despite power constraints. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement appropriate logic circuits without undue experimentation.

As previously described, a problem exists for improving processor performance while adhering to power constraints. The present methods incorporate lowering the voltage or frequency at the expense of overall performance. In contrast, the claimed subject matter improves overall performance while adhering to power constraints. For example, a concept of "rationing the number of executing cores for a processor system" allows for increasing frequency as a result of disabling clocks to cores that are idle as they wait for a memory transaction to complete. For example, the claimed subject matter exploits the idle time period of processor cores by disabling the clocks to the core, that results in less power dissipation. Thus, a higher frequency can be utilized as a result of the decrease in power dissipation. In one embodiment, an appropriate executing core limit is calculated for the workload. Also, in the same embodiment, the number of executing cores are less than or equal to the number of available and ready threads. A thread is an independent set of instructions for a particular application.

In one embodiment, the claimed subject matter facilitates selecting a voltage/frequency operating point based on a prediction of the activity level of the threads running on all of the cores collectively. For example, TPC-C threads tend to be active 50-60% of the time, and spend 40-50% of their time idle, waiting for memory references to be completed. In such an environment, one would specify an executing core limit that would be, in one embodiment, 60% of the total number of cores on the die; if there were 8 cores, one would set the executing core limit to, in this case, five. One would then specify a voltage-frequency operating point that corresponds to having only five cores active and three cores inactive (low power state) at a time; this is a significantly higher operating frequency than one would specify if one was allowing all eight cores to be simultaneously active. The core rationing logic constrains the operations of the die, guaranteeing that no more than five cores (in this case) are active at any given moment. Statistics are gathered regarding the occupancy of the Waiting and Rationing queues (which will be discussed further in connection with FIG. 1); at intervals these statistics are analyzed to determine whether the operating point (executing core limit and its associated voltage/frequency pair) should be changed. If the Waiting queue tends to be empty and the Rationing queue tends to be full, that is an indication that cores are not making progress when they could be, and that to improve performance the executing core limit should be raised and the voltage/frequency reduced; conversely, if the Rationing queue tends to be empty, and the Waiting queue tends to be full, this may be an indication that one can increase performance by reducing the executing core limit and increasing the voltage/frequency point.

FIG. 1 illustrates a flowchart for a method utilized in accordance with an embodiment. In one embodiment, the flowchart depicts a method for a state diagram.

In the same embodiment, the state diagram illustrates a predetermined state machine for a processor core in a system. In this same embodiment, the state machine facilitates the "rationing of the cores" to improve processor performance as a result of disabling clocks to cores that are waiting for a memory transaction to complete.

In one embodiment, the state diagram has four defined states, such as, a Core Unassigned state 202, an Executing state 204, a Rationing FIFO Queue state 206, and a Waiting state 208. Initially, the Core Unassigned state is defined as follows: each core does not have an assigned thread. Subsequently, in the event that a core has a thread assigned to it, the claimed subject matter transitions to the Rationing FIFO Queue state 206. In one embodiment, FIFO is defined as a First In First Out.

Upon transitioning to the Rationing FIFO Queue state, a comparison between the number of executing cores and an executing core limit (ECL) is determined. In one embodiment, a processor or system specification determines the proper executing core limit in order to adhere to thermal power considerations. In one embodiment, the ECL is determined by a formula depicted later in the application. If the number of executing cores is less than ECL, the particular core transitions to the Executing state 204 if the core was the next one to be processed in the FIFO queue. Otherwise, the core remains in the Rationing FIFO queue 206.

Upon entering the Executing state, the core remains in this state unless an event occurs, such as, a memory reference and overheating event, and/or a fairness timeout. For example, a fairness timeout may be utilized to prevent a possible live lock state. In this context, a memory reference refers to a read or write operation to a particular memory address that does not reside in any cache memory coupled to the processor ("a miss in all levels of cache memory"). Therefore, an access to main memory is initiated.

If an event occurs as previously described, the core transitions to the Waiting state 208. Upon completion of the event, the core transitions to the Rationing FIFO queue state. This sequence of cycling between states 204, 206, and 208 occurs until the particular thread is completed. Upon completion of the thread, the core transitions to the Core Unassigned State.

However, the claimed subject matter is not limited to the four defined states in the state diagram. The claimed subject matter supports different amounts of states. FIG. 1 merely illustrates an example of limiting the number of executing cores to be less than the available number of threads. For example, one embodiment would allow for multiple waiting states. Alternatively, the waiting states could be replaced by another queue state.

Also, other embodiments of state diagrams would allow multiple priority levels for cores, as well as having different waiting queues depending on the nature of the event that provoked exit from the executing state (memory wait, thermal wait, ACPI wait, etc).

Typically, a core executes a memory read or write operation and subsequently executes an operation that is dependent on that operation (for example, it makes use of the data returned by a memory read operation). Subsequently, the core "stalls" waiting for that memory operation to be completed. In such a case, it asserts a signal to the central core rationing logic indicating that it is stalled; this is the indication that it is eligible to be disabled by the core rationing logic. The core rationing logic responds to this signal by "napping" the core in question—it asserts a "nap" signal to the core, which causes the core to block instruction issue and then transition into a (cache-coherent) low power state. Furthermore, the core rationing logic puts an identifier for that core in the Waiting queue. When the memory operation completes, the core deasserts the "stall" signal; the core rationing logic responds to this by moving the identifier for that core from the Waiting queue to the Rationing queue. If the number of currently executing (not "napped") cores is less than or equal to the Executing Core Limit, the core rationing logic removes the oldest identifier from the Rationing queue, and deasserts the "nap" signal to that core.

Figure 2:
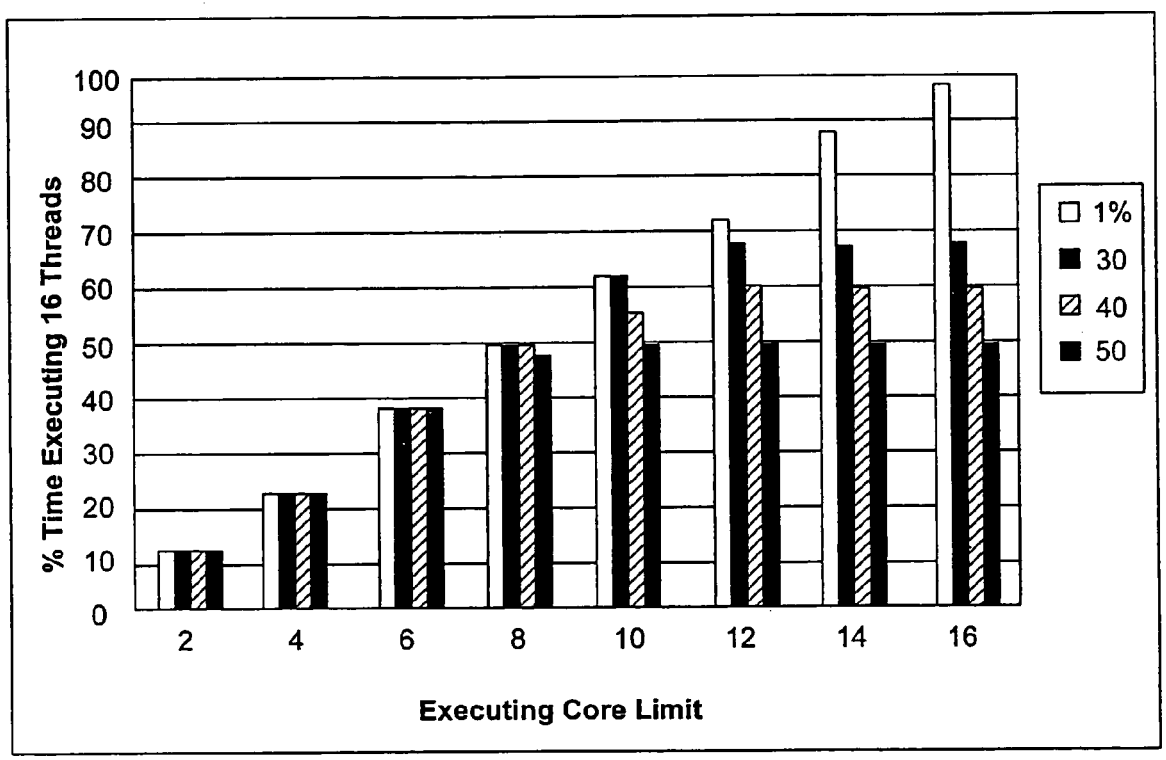
FIG. 2 illustrates a bar chart utilized in accordance with an embodiment.

FIG. 2 illustrates a bar chart utilized in accordance with an embodiment. In one embodiment, the bar chart depicts a percentage time spent executing for a 16-core multiprocessor as calculated by a Monte Carlo simulation for a variety of workloads. The independent axis illustrates the ECL for 2, 4, 6, 8, 10, 12, 14, and 16. Also, there is a bar for each ECL at a different workload as simulated with a memory reference duty cycle (with respect to executing time) of 1%, 30%, 40%, and 50%.

Analyzing the 50% memory reference duty cycle highlights the fact that the percentage time executing saturates at 50%. Thus, processing the memory references consumes half of the executing time when the ECL is equal to the number of available threads.

Figure 3:
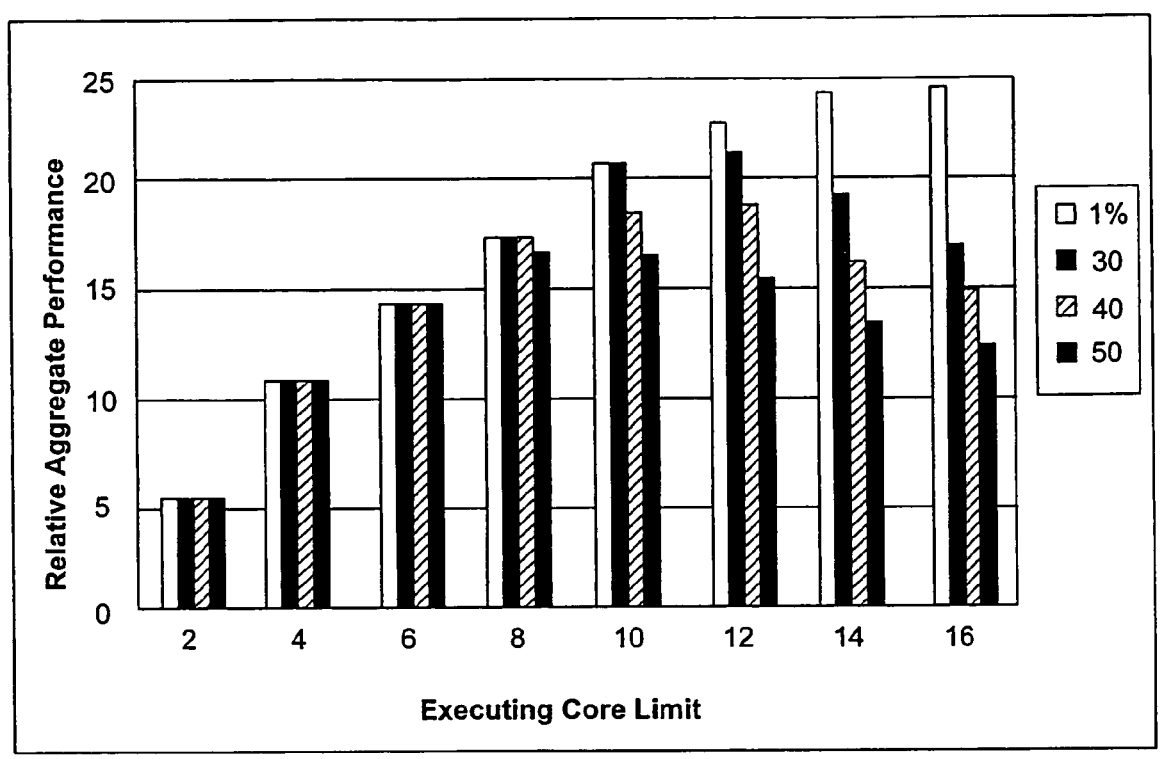
FIG. 3 illustrates a bar chart utilized in accordance with an embodiment.

FIG. 3 illustrates a bar chart utilized in accordance with an embodiment. In addition to FIG. 2, FIG. 3 illustrates the total performance as calculated by the product of the percentage time executing and the frequency. The total performance also incorporates the fact that frequency is inversely proportional to the ECL. As previously described, this relationship exists because as one reduces the number of executing cores, this results in reducing power dissipation. Therefore, the frequency can be increased to remain at the steady-state thermal limit.

Also, FIG. 3 depicts the maximum percentage time executing is 70% for the 30% memory reference duty cycle. Also, the product of the saturation limit and the number of threads demarcates the onset of saturation. Of particular note is the onset of saturation because this may be the region for improved or optimum performance.

In one embodiment, a self optimization formula is utilized to determine the appropriate ECL. In the formula, N depicts the number of threads that have context; % E depicts the percentage executing time; and % M depicts the percentage memory reference time. The formula is:

$$\text{int } (N \times (\% \ E/(\% \ E + \% \ M)))$$

Figure 4:
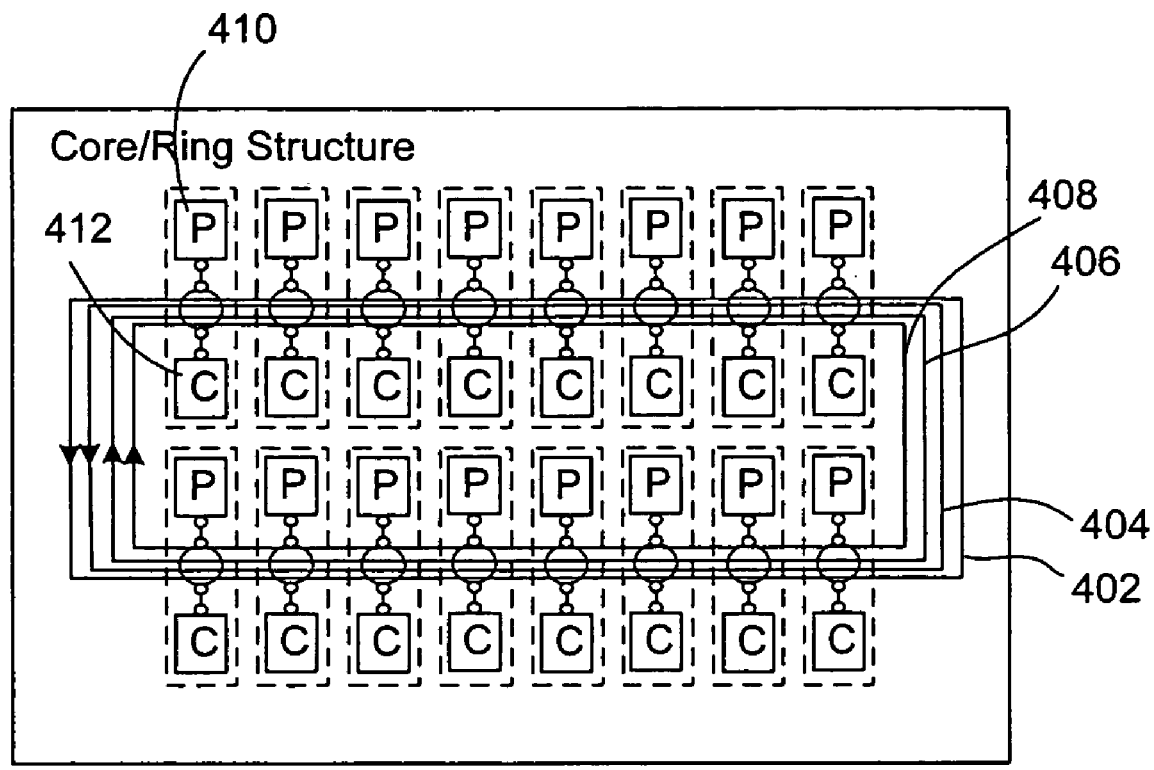
FIG. 4 illustrates an apparatus in accordance with one embodiment.

FIG. 4 depicts an apparatus in accordance with one embodiment. In one embodiment, the apparatus depicts a multi-core processor system with a plurality of processors 410 coupled individually to an independent bank of Level 3 (L3) Cache memory. In the same embodiment, a plurality of four busses form two counter rotating "rings"—a Request/Response (REQ0/RSP0) ring (402 and 404) in the clockwise direction, and a Request/Response ring (REQ1/RSP1) (406 and 408) in the counterclockwise direction. The circle in between the "P"s and the "C"s represents a pair of state devices for each ring. Thus, a set of circular pipelines are utilized for passing information from each processor core/cache bank to any other processor core/cache bank. The system interface logic contains the memory controllers for memory DIMMs, the router logic to handle the interconnection links to other processor dies and/or I/O subsystems, and assorted other system control logic (including the central core rationing controller).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method for control of multi-core processors comprising:

assigning a first state to a core without an assigned thread;

causing the core to operate in the first state;
assigning a second state to one or more cores having a corresponding indication in a queue to store indications of cores with an assigned thread;
causing the one or more cores having indications in the queue to operate in the second state;
comparing the number of enabled cores to an executing core limit, assigning a third state for enabling the core to run a thread if the number of enabled cores is less than the executing core limit; and
assigning a fourth state to cause a core to be disabled.

2. The method of claim 1 wherein the queue is a first in first out (FIFO) queue.

3. The method of claim 1 wherein the executing core limit is based at least in part on a formula, wherein N depicts the number of threads that have context; % E depicts the percentage executing time; and % M depicts the percentage memory reference time and the formula is:

$$\text{int } (N \times (\% \ E / \ (\% \ E + \% \ M))).$$

4. The method of claim 1 wherein the core transitions from a third state to the fourth state if the core is idle as it waits for completion of a memory operation.

5. The method of claim 1 wherein the core transitions from a third state to the fourth state if the core is idle as it waits for completion of a memory operation.

6. A method comprising:
placing a first processing core of a plurality of processing cores into an execution queue to await enablement for execution of a thread assigned to the processing core;
determining the number of cores from the plurality of processing cores that are executing a thread assigned each respective core;
determining if the number of cores from the plurality of processing cores that are executing a thread is less than an executing core limit;
if the number from the plurality of processing cores that are executing a thread is less than the executing core limit and the first processing core is the next to be processed from the execution queue,
enabling the first processing core, and
removing the first processing core from the execution queue.

7. The method of claim 6, further comprising:
assigning a thread to the first processing core.

8. The method of claim 6, further comprising:
placing the first processing core into a waiting queue after a specified event occurs; and
disabling the first processing core.

9. The method of claim 8, wherein disabling the first processing core comprises:
disabling a clock to the first processor core.

10. The method of claim 8, further comprising:
placing the first processing core into the execution queue from the waiting queue after the specified event as completed.

11. The method of claim 6, further comprising:
removing the thread assignment from the first processing core after the thread has completed execution; and
disabling the first processing core.

12. The method of claim 11, wherein disabling the first processing core comprises:
disabling a clock to the first processor core.

13. The method of claim 6, wherein the execution queue is a first-in first-out (FIFO) queue.

14. The method of claim 6 wherein the executing core limit is based at least in part on formula, N*E/E+M' wherein N depicts the number of threads that have context, E depicts the percentage executing time, M depicts the percentage memory reference time, and the result of the formula is rounded down to the nearest integer to represent the executing core limit.

* * * * *